(12) United States Patent
Nama et al.

(10) Patent No.: US 9,510,205 B2
(45) Date of Patent: Nov. 29, 2016

(54) LOAD-BASED DYNAMIC FRACTIONAL FREQUENCY REUSE IN AN LTE NETWORK

(71) Applicant: SpiderCloud Wireless, Inc., San Jose, CA (US)

(72) Inventors: Hithesh Nama, San Jose, CA (US); Pete Worters, San Carlos, CA (US); Gopal Harikumar, Fremont, CA (US)

(73) Assignee: SPIDERCLOUD WIRELESS, INC., Milpitas, CA (US)

( * ) Notice: Subject to any disclaimer, the term of this patent is extended or adjusted under 35 U.S.C. 154(b) by 77 days.

(21) Appl. No.: 13/859,480

(22) Filed: Apr. 9, 2013

(65) Prior Publication Data

US 2014/0302859 A1 Oct. 9, 2014

(51) Int. Cl.
*H04W 72/00* (2009.01)
*H04W 16/10* (2009.01)

(52) U.S. Cl.
CPC .................................. *H04W 16/10* (2013.01)

(58) Field of Classification Search
CPC ... H04W 16/02; H04W 16/04; H04W 16/08; H04W 16/10; H04W 24/02; H04W 28/02; H04W 28/0284; H04W 28/0226; H04W 28/0236; H04W 28/08; H04W 36/06; H04W 36/08; H04W 36/20; H04W 36/24
USPC .......................... 455/446, 447, 448, 450, 453
See application file for complete search history.

(56) References Cited

U.S. PATENT DOCUMENTS

| | | | |
|---|---|---|---|
| 6,226,277 B1 * | 5/2001 | Chuah | 370/328 |
| 8,529,601 B2 * | 9/2013 | Green et al. | 606/232 |
| 2008/0151821 A1 * | 6/2008 | Cho et al. | 370/329 |
| 2008/0240032 A1 * | 10/2008 | Gelbman et al. | 370/329 |
| 2008/0267063 A1 * | 10/2008 | Trigui et al. | 370/229 |
| 2009/0034457 A1 * | 2/2009 | Bahl et al. | 370/329 |
| 2012/0120888 A1 * | 5/2012 | Miao | H04B 1/7143 370/329 |
| 2012/0157155 A1 * | 6/2012 | Cho et al. | 455/522 |
| 2012/0230267 A1 * | 9/2012 | Sundaresan et al. | 370/329 |
| 2012/0264416 A1 * | 10/2012 | Pica et al. | 455/422.1 |
| 2013/0102254 A1 * | 4/2013 | Cyzs et al. | 455/63.1 |
| 2013/0260817 A1 * | 10/2013 | Dahrouj et al. | 455/522 |

* cited by examiner

*Primary Examiner* — Temica M Beamer
(74) *Attorney, Agent, or Firm* — Stuart H. Mayer; Mayer & Williams PC (57) ABSTRACT

A services node or central controller or coordinator is provided that dynamically computes fractional frequency reuse allocation among user equipment in a radio access network. The central controller or coordinator communicates the fractional frequency reuse allocation and configures the individual MAC schedulers within each radio node in the radio access network. Inputs to the central coordinator may include its serving radio node, a detected set of radio nodes, and information about user equipment buffer status both in the downlink and uplink. In one implementation, interference graphs are constructed for downlinks and uplink separately and the same are used with a heuristic independent set algorithm to compute the frequency allocation.

16 Claims, 9 Drawing Sheets

Fig. 3
DOWNLINK

Fig. 4
UPLINK

LOAD-BASED DYNAMIC FRACTIONAL FREQUENCY REUSE IN AN LTE NETWORK

BACKGROUND

Operators of mobile systems, such as Universal Mobile Telecommunications Systems (UMTS) and its offspring including LTE (Long Term Evolution) and LTE-Advanced, are increasingly relying on wireless small cell radio access networks (RANs) in order to deploy indoor voice and data services to enterprises and other customers. Such small cell RANs typically utilize multiple-access technologies capable of supporting communications with multiple users using radio frequency (RF) signals and sharing available system resources such as bandwidth and transmit power. While such small cell RANs operate satisfactorily in many applications, there exists a need for further improvements in small cell RAN technologies.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Systems and methods according to implementations of principles disclosed here provide an LTE E-RAN employing a hierarchical architecture with a central controller or coordinator controlling multiple LTE radio nodes. The central controller or coordinator may form a portion of a services node in communication with radio nodes that service user equipment or UEs. The systems and methods provide for a fractional frequency reuse ("FFR") scheme with a central controller that dynamically computes the FFR allocation and configures individual MAC schedulers within each radio node. The central controller may receive information about, for each UE, an associated radio node, e.g., in LTE an eNodeB as will be described, the set of adjacent radio nodes or cells that a UE is able to detect within a fixed signal strength offset from its serving cell, uplink measurements from eNodeBs, and in some cases the volume of uplink and/or downlink traffic, required to be served, to be transmitted to and from the UE.

In an exemplary method, the UEs may be partitioned by the central controller into a number of sets with each set having UEs with the same serving eNodeB and the same detected set of eNodeBs. Each set may be characterized by parameters including, e.g., the size of the set, the aggregate downlink buffer occupancy of the UEs in the set, and the aggregate uplink buffer occupancy of the UEs in the set. Interference graphs for the downlink and the uplink may then be constructed, and the same employed to determine which connections can be simultaneously scheduled and which cannot, thus informing the FFR allocation scheme. The connections may have weights associated therewith that correspond to the buffer occupancy of the associated set of UEs. In some exemplary methods, a heuristic independent-set algorithm may be employed for the interference graph to compute an FFR allocation schedule such that all sets of UEs are served efficiently (where an independent set is a set of nodes in a graph such that no two nodes are connected by an edge).

Advantages of certain implementations according to present principles may include one or more of the following.

Certain implementations may provide the benefits of FFR in a way that is load-based and dynamic. Due to use of a centralized controller, e.g., within a services node, certain implementations may provide faster, more accurate, and more up-to-date decisions due to the central data location and centralized processing. In other words, instead of distributed algorithms, where peers of cells are exchanging messages, a single central point may act as a central coordination point and may determine how frequencies are allocated and partitioned. The load-based nature of certain implementations allows the calculation of buffer occupancies within UEs, the state of UEs, the presence of interference from other cells, and the like. Other advantages of certain implementations will be apparent from the description that follows, including the figures and claims.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

Like reference numerals indicate like elements in the drawings. Elements are not drawn to scale unless otherwise indicated.

DETAILED DESCRIPTION

Figure 1:
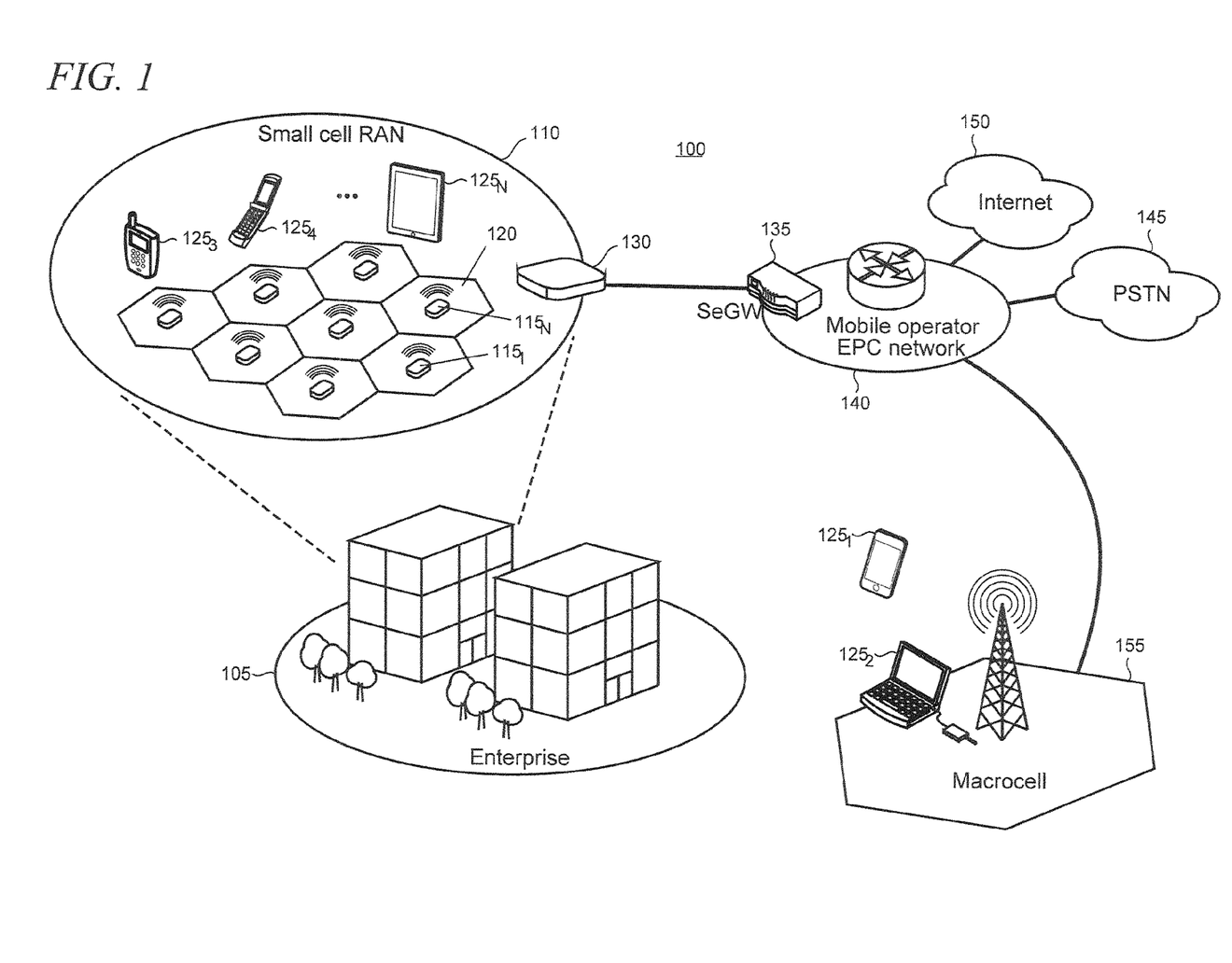
FIG. 1 shows an illustrative mobile telecommunications environment in which the present LTE FFR improvement may be practiced.

FIG. 1 shows an illustrative mobile telecommunications environment 100 in which the present invention may be practiced. The mobile telecommunications environment 100, in this illustrative example, is arranged as an LTE (Long Term Evolution) system as described by the Third Generation Partnership Project (3GPP) as an evolution of the GSM/UMTS standards (Global System for Mobile communication/Universal Mobile Telecommunications System). It is emphasized, however, that the present principles described herein may also be applicable to other network types and protocols. The environment 100 includes an enterprise 105 in which a small cell RAN 110 is implemented. The small cell RAN 110 includes a plurality of radio nodes (RNs) 1151 . . . N. Each radio node 115 has a radio coverage area (graphically depicted in the drawings as a hexagonal shape) that is commonly termed a small cell. A small cell may also be referred to as a femtocell, or using terminology defined by 3GPP as a Home Evolved Node B (HeNB). In the description that follows, the term "cell" typically means the combination of a radio node and its radio coverage area unless otherwise indicated. A representative cell is indicated by reference numeral 120 in FIG. 1.

The size of the enterprise 105 and the number of cells deployed in the small cell RAN 110 may vary. In typical implementations, the enterprise 105 can be from 50,000 to 500,000 square feet and encompass multiple floors and the small cell RAN 110 may support hundreds to thousands of users using mobile communication platforms such as mobile phones, smartphones, tablet computing devices, and the like (referred to as "user equipment" (UE) and indicated by reference numerals 1251-N in FIG. 1). However, the foregoing is intended to be illustrative and the solutions described herein can be typically expected to be readily scalable either upwards or downwards as the needs of a particular usage scenario demand.

In this particular illustrative example, the small cell RAN 110 includes one or more services nodes (represented as a single services node 130 in FIG. 1) that manage and control the radio nodes 115. In alternative implementations, the management and control functionality may be incorporated into a radio node, distributed among nodes, or implemented remotely (i.e., using infrastructure external to the small cell RAN 110). The radio nodes 115 are coupled to the services node 130 over a direct or local area network (LAN) connection (not shown in FIG. 1) typically using secure IPsec tunnels. The services node 130 aggregates voice and data traffic from the radio nodes 115 and provides connectivity over an IPsec tunnel to a security gateway SeGW 135 in an Evolved Packet Core (EPC) 140 network of a mobile operator. The EPC 140 is typically configured to communicate with a public switched telephone network (PSTN) 145 to carry circuit-switched traffic, as well as for communicating with an external packet-switched network such as the Internet 150.

The environment 100 also generally includes Evolved Node B (eNB) base stations, or "macrocells", as representatively indicated by reference numeral 155 in FIG. 1. The radio coverage area of the macrocell 155 is typically much larger than that of a small cell where the extent of coverage often depends on the base station configuration and surrounding geography. Thus, a given UE 125 may achieve connectivity to the network 140 through either a macrocell or small cell in the environment 100.

Figure 2:
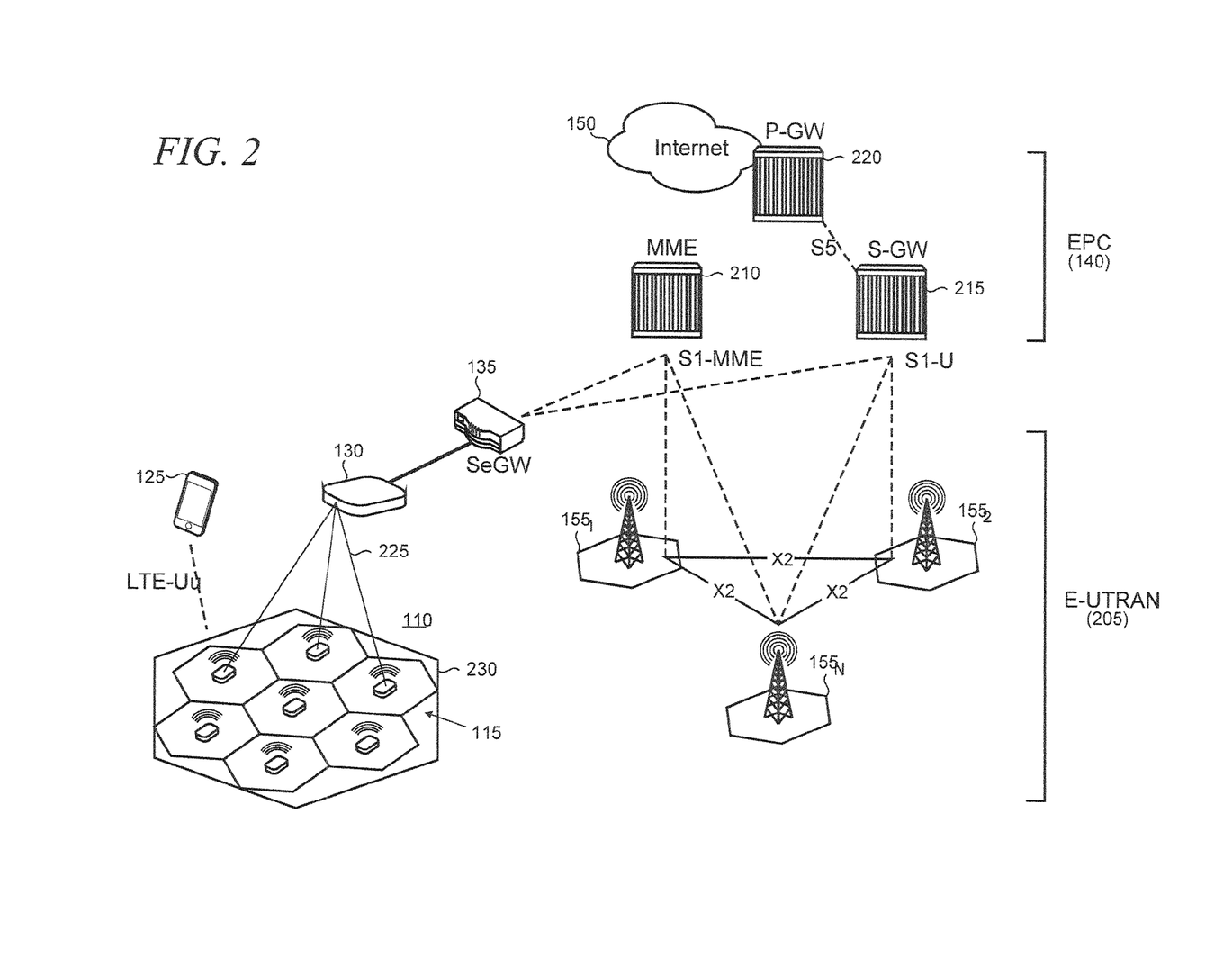
FIG. 2 shows details of an EPC (Evolved Packet Core) and E-UTRAN (Evolved UMTS Terrestrial Radio Access Network where UMTS is an acronym for Universal Mobile Telecommunications System) arranged under LTE (Long Term Evolution) with which a small cell network may interoperate.

Along with macrocells 155, the small cell RAN 110 forms an access network, i.e., an Evolved UMTS Terrestrial Radio Access Network (E-UTRAN) under 3GPP as represented by reference numeral 205 in FIG. 2. As shown, there is no centralized controller in the E-UTRAN 205, hence an LTE network architecture is commonly said to be "flat." The macrocells 155 are typically interconnected using an X2 interface and to the EPC 140 by means of an S1 interface. More particularly, the macrocells are connected to the MME (Mobility Management Entity) 210 in the EPC 140 using an S1-MME interface and to the S-GW (Serving Gateway) 215 using an S1-U interface. An S5 interface couples the S-GW 215 to a P-GW (Packet Data Network Gateway) 220 in the EPC 140 to provide the UE 125 with connectivity to the Internet 150. A UE 125 connects to the radio nodes 115 over an LTE-Uu interface.

The SeGW 135 is also connected to the MME 210 and S-GW 215 in the EPC 140 using the appropriate S1 connections. Accordingly, as each of radio nodes 115 in the small cell RAN 110 is operatively coupled to the services node 130 (as representatively shown by lines 225), the connections from the radio nodes 115 to the EPC 140 are aggregated to the EPC 140. Such aggregation preserves the flat characteristics of the LTE network while reducing the number of S1 connections that would otherwise be presented to the EPC 140. The small cell RAN 110 thus essentially appears a single eNB 230 to the EPC 140, as shown.

The LTE air interface uses Orthogonal Frequency Division Multiplexing (OFDM) for enhanced throughput and spectral efficiency. The air interface has a transmission time interval of 1 msec along with other features to lower latency. The primary element used in scheduling transmissions is a "resource block" (RB), and resource blocks make up frames and subframes, which in turn include both control regions and data regions.

One of the most significant issues in a multi-cell deployment is the performance of user equipment at cell edge. For example, a UE at a cell edge experiences significant interference from the downlink transmissions of adjacent eNBs in decoding the downlink transmissions from its own serving cell. As a result, the cell-edge spectral efficiency is significantly poorer than that in the interior of the cell. The LTE standard has introduced several coordination mechanisms to improve cell-edge performance.

Figure 3:
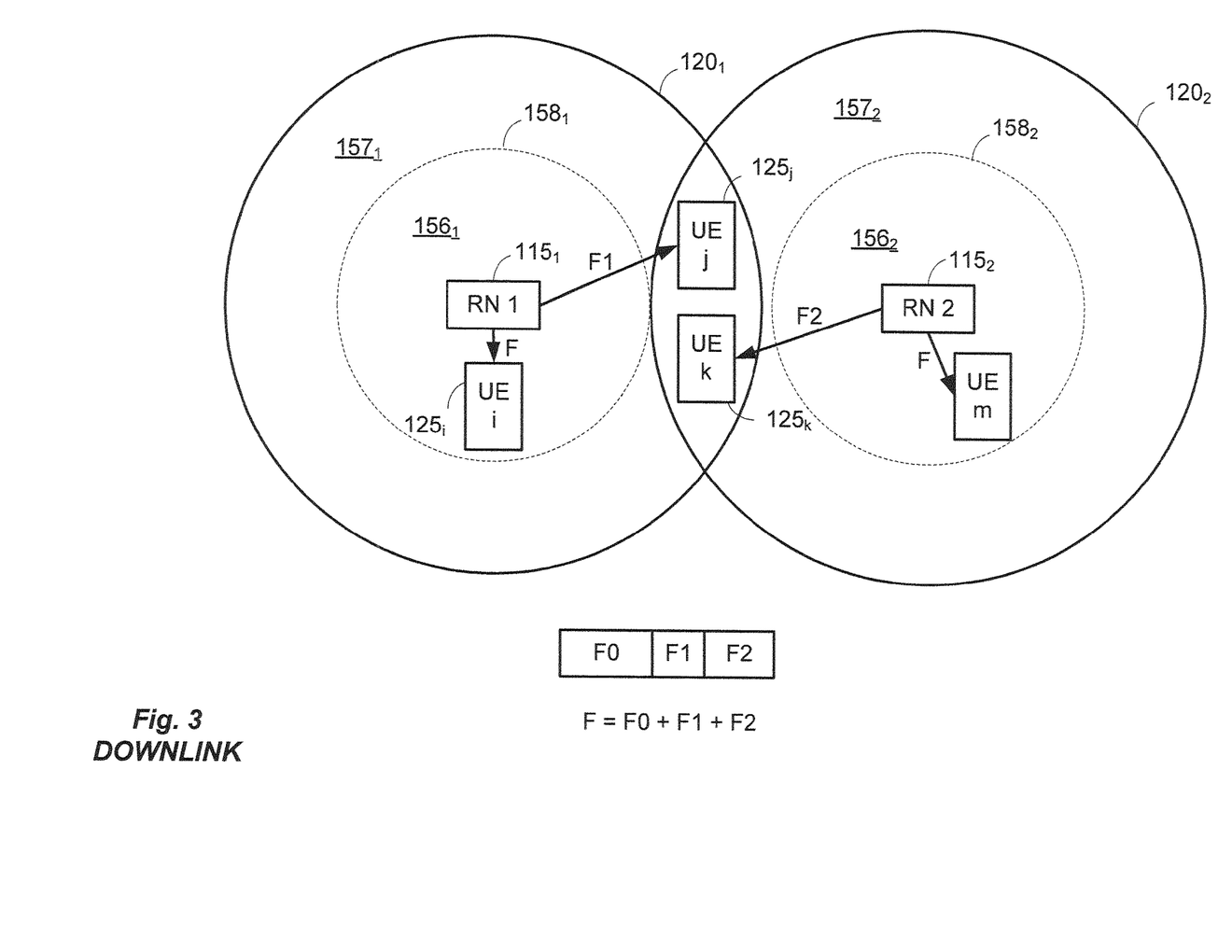
FIG. 3 illustrates a layout for an exemplary FFR scheme in a downlink configuration.

In one such mechanism, an FFR scheme, provided to some extent in the Standard "Inter-Cell Interference Coordination" (ICIC), uses non-overlapping resource blocks for cell-edge UEs of adjacent eNBs as illustrated in FIG. 3. In the figure, overlapping cells $120_1$ and $120_2$ are illustrated with respective cell interiors $156_1$ and $156_2$ as well as respective cell edges $157_1$ and $157_2$. Dotted lines $158_1$ and $158_2$ are shown to delineate the cell interior from the cell edge. Respective first and second radio nodes $115_1$ and $115_2$ serve the cells. Various UEs are shown, including $UE_i$ $125_i$, $UE_j$ $125_j$, $UE_k$ $125_k$, and $UE_m$ $125_m$. In the downlink diagram of FIG. 3, $UE_i$ $125_i$ and $UE_j$ $125_j$ are served by the first radio node (RN 1) $115_1$, and $UE_k$ $125_k$ and $UE_m$ $125_m$ are served by the second radio node (RN 2) $115_2$.

UEs in the interior of the cells $120_1$ and $120_2$, i.e. within respective dotted lines $158_1$ and $158_2$, may be allocated resource blocks across the entire available bandwidth F=F0+F1+F2, with relatively lower power used for F1 and F2 to avoid interfering with cell-edge UEs of adjacent cells. However, cell-edge UEs on the adjacent cells may be allocated non-overlapping resource blocks in F1 and F2. In this way, interference may be reduced.

Figure 4:
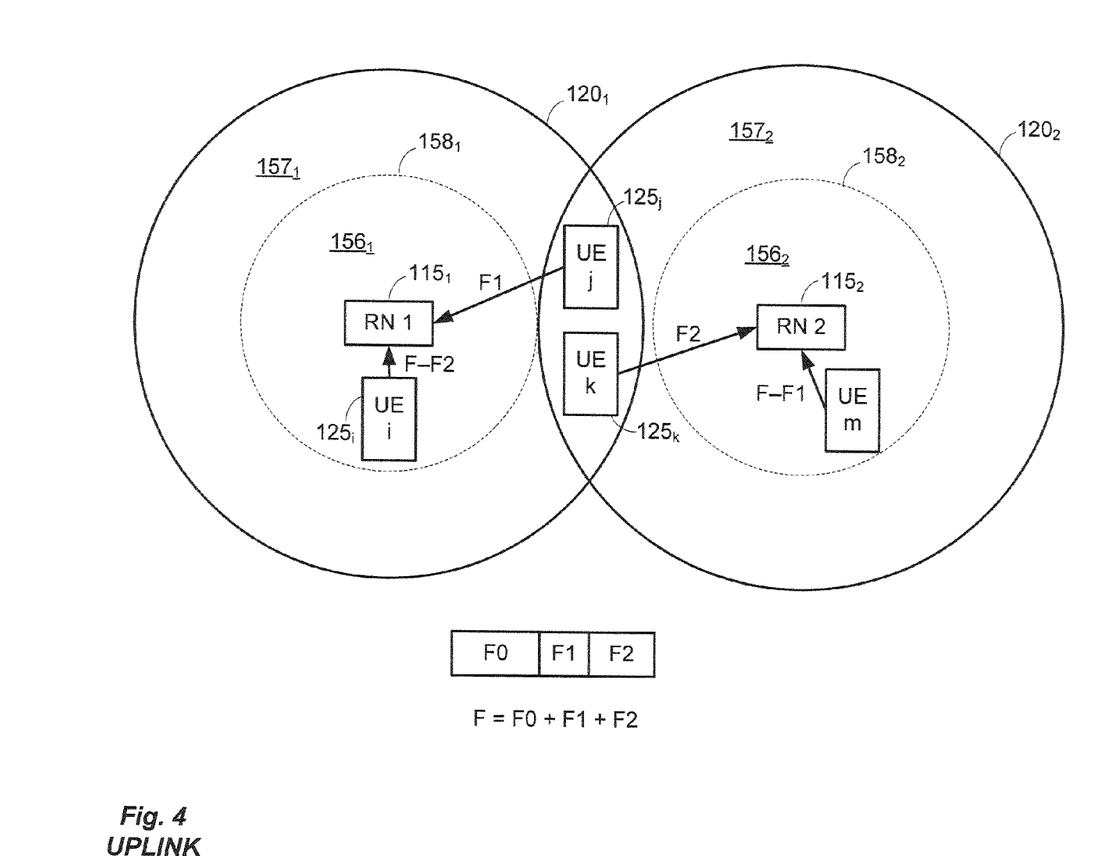
FIG. 4 illustrates a layout for an exemplary FFR scheme in an uplink configuration.

Similarly, in the uplink as shown in FIG. 4, transmissions from cell-edge users can cause significant interference to adjacent eNBs in corresponding resource blocks. Thus, FFR may similarly be employed in systems to prevent such interference. In one scheme, shown in the figure, non-overlapping resource blocks are used for cell-edge UEs of adjacent eNBs. UEs in the interiors of the cells $156_1$ and $156_2$ can only be allocated resource blocks that are unused by cell-edge UEs from adjacent cells, i.e., F-F1 or F-F2. Cell-edge UEs on the adjacent cells are allocated non-overlapping resource blocks in F1 and F2.

In the above systems, however, certain disadvantages are seen. For example, in 3D deployments such as multi-floor buildings, the number of neighboring eNBs may be much higher than in a 2-D deployment. Therefore, the number of non-overlapping frequency bands for cell-edge users would need to be higher, resulting in fewer resources at cell edge for each eNB. Even more, a static allocation of non-overlapping frequency bands for cell-edge use is wasteful if there are no cell-edge UEs within some of the cells.

The above-noted ICIC standard allows eNBs to exchange transmitted power per resource block over the X2 interface. This information may then be employed by eNBs to coordinate the use of non-overlapping cell-edge resource blocks in a distributed manner. However, the efficiency of such a coordination schemes depends on the latency of the X2 interface, the number of messages required to be exchanged, and on the rate of convergence of the distributed algorithm. Moreover, the standard only specifies the messages exchanged over the X2 interface between eNBs, and not the algorithm to be employed.

To address these issues, certain implementations according to present principles provide additional features that in some cases overcome the disadvantages. Referring to FIG. 5(A), cells $120_1$ and $120_2$ are illustrated having respective cell interiors $156_1$ and $156_2$ and cell edges $157_1$ and $157_2$ delineated by boundaries $158_1$ and $158_2$. Cells $120_1$ and $120_2$ are serviced by a first radio node $115_1$ (RN1) and a second radio node $115_2$ (RN2). In these implementations the radio nodes act as eNBs.

Generally a UE is able to detect a number of adjacent radio nodes or cells, within a fixed signal strength, offset from its serving cell. Such are referred to herein as a "detected set". The detected set and other information may be generally reported by the UE as a part of periodic or event-triggered Radio Resource Control (RRC) Measurement Report Messages (MRM). Such information may also be inferred using physical layer measurements at the eNB, e.g., SRS measurements, or Channel Quality Indicator (CQI) reports from the UE. In some implementations separate downlink and uplink 'detected sets' may be employed for each UE, since downlink and uplink channel conditions may vary significantly.

Figure 6:
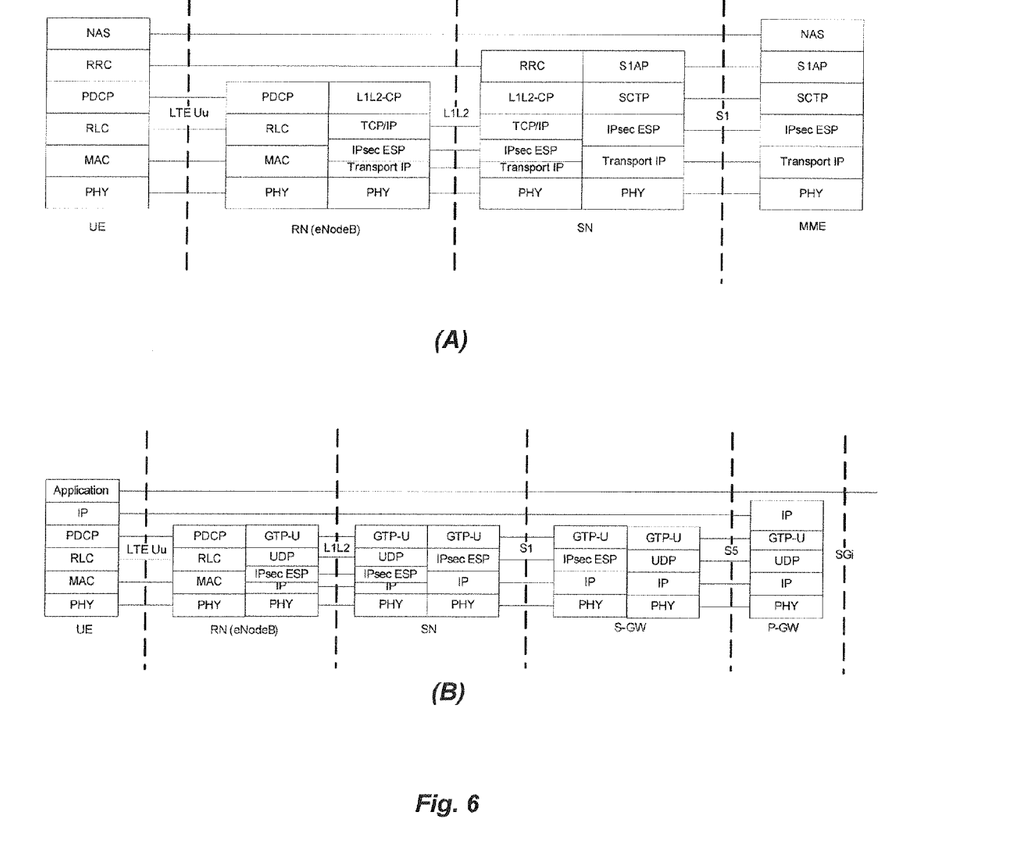
FIGS. 6(A) and 6(B) illustrate control and user plane protocol stacks for an LTE radio access network.

In the standard LTE protocol stack, the downlink and uplink MAC schedulers, which run scheduling algorithms to determine transmissions to and from UEs, are a part of the MAC layer on the eNB (see the control and user plane protocol stacks illustrated in FIGS. 6(A) and 6(B) respectively). Thus, with an interference coordination scheme like FFR, the simplest frequency allocation for cell-edge users (see F0, F1, F2 in FIGS. 3 and 4) is generally a static assignment that is configured in the MAC schedulers at each eNB. As noted above, some FFR schemes use the X2 interface and standardized ICIC messages. However, a disadvantage with such schemes currently is that the defined messages are generally limited, being restricted to resource logs or information about signal strength, frequencies, or the like. Accordingly such fail to include, e.g., information about the load on the UEs and thus are limited in their ability to dynamically address changing network conditions.

Figure 5:
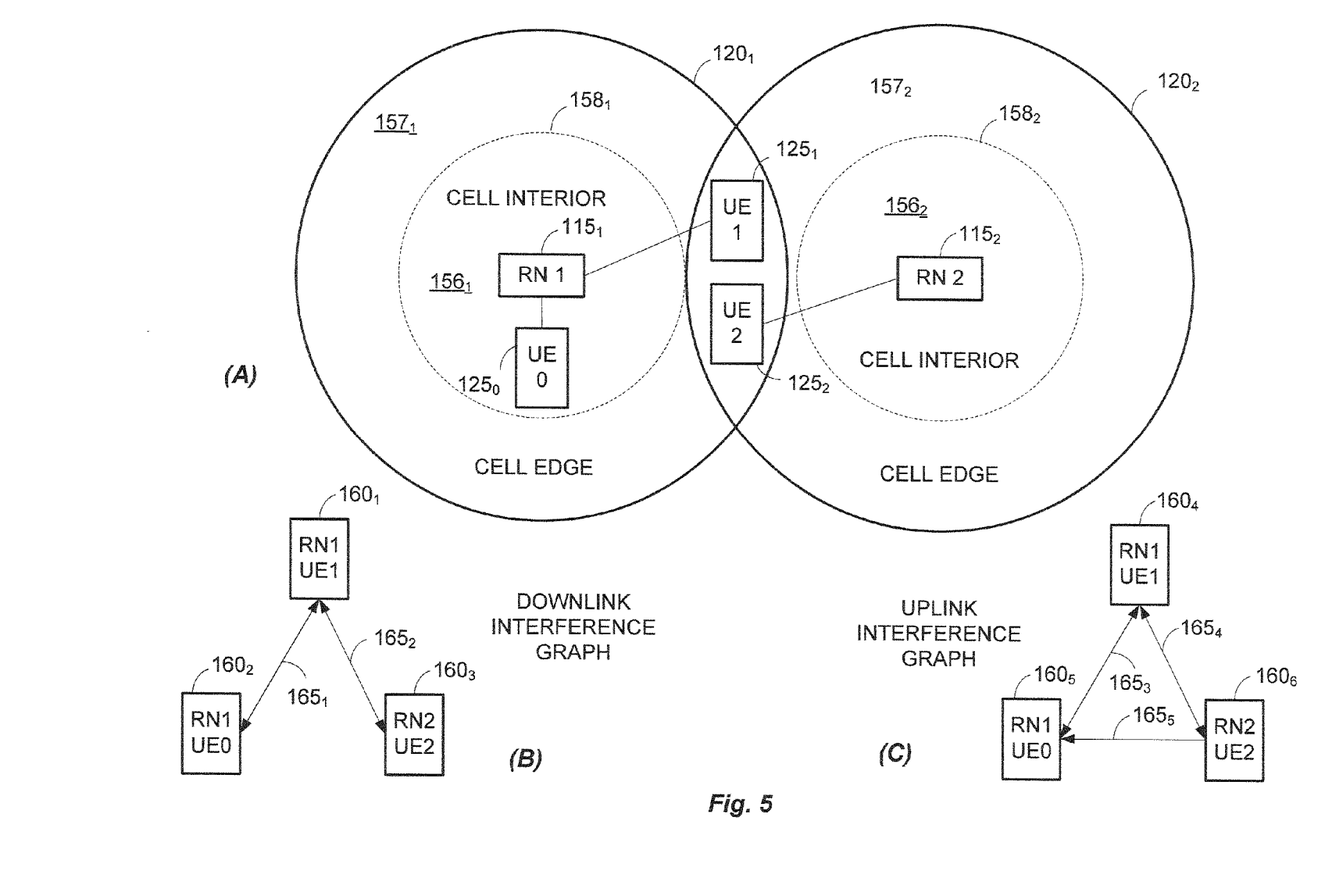
FIGS. 5(A)-5(C) illustrate layouts for an exemplary FFR scheme according to present principles.

Accordingly, and referring back to FIG. 5, an FFR scheme may be employed with a central coordinating entity, e.g., hosted on a services node, that dynamically computes the FFR allocation and accordingly configures the individual MAC schedulers within each radio node. Use of a central coordinating entity provides a number of benefits, in particular, frequency allocations can be calculated much more efficiently and rapidly as opposed to distributed algorithms in which a mesh of eNBs would exchange messages and generally take much greater computational time to converge to a global optimal solution.

The use of centralized processing also provides benefits for dynamic or "on-the-fly" modification of frequency allocations. As the central controller can obtain and employ information about UE loads in certain implementations, as noted above, such may be employed in the calculation to intelligently and dynamically partition frequencies between radio nodes. For example, as the buffer on one UE is emptied, frequencies may be apportioned to support additional data transfer from UEs with fuller buffers.

Figure 7:
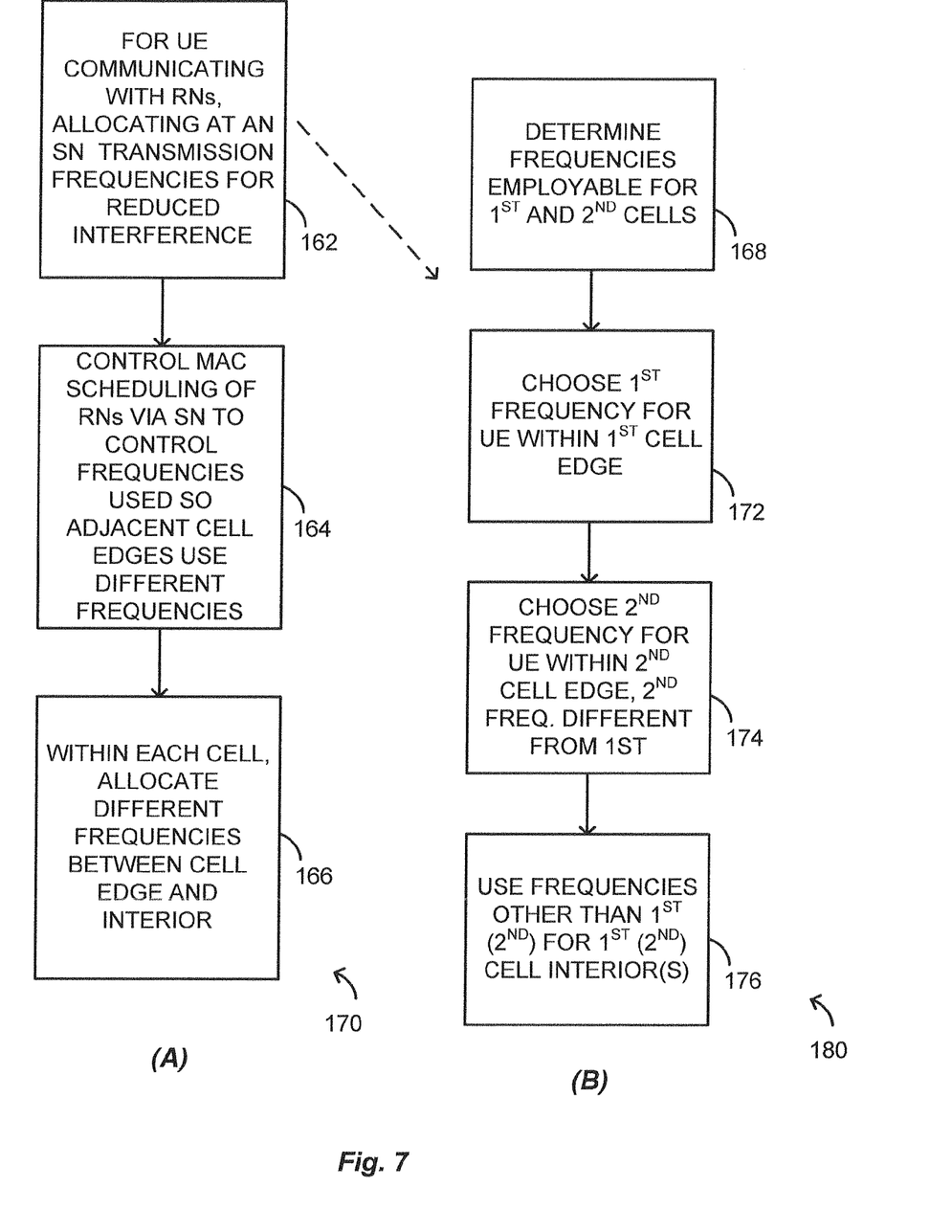
FIGS. 7(A) and 7(B) are flowcharts of an illustrative method according to present principles for reducing UE interference using FFR.

Additional details about one implementation of a method according to present principles may be seen by the flowcharts 170 and 180 respectively of FIGS. 7(A) and 7(B). In the method of flowchart 170, for UEs communicating with radio nodes, transmission frequencies are allocated at a central coordinating entity, e.g., a services node as described above, such that UEs encounter reduced interference (step 162) from other UEs. A method to perform such allocation is described below, but here it is noted that the method uses information such as, for each UE, information about its serving radio node, i.e., eNB, the detected set of radio nodes or eNBs, and in some cases as noted above the uplink and downlink buffer occupancy status.

MAC schedulers at the individual radio nodes are then controlled so that adjacent cell edges use different frequencies, i.e., the method assigns different frequencies to cell-edge UEs (step 164). As an additional step, within each cell, different frequencies (or sets of frequencies) may be allocated as between UEs in the cell edge and those in the cell interior (step 166).

In a more specific implementation, and referring to the flowchart 180 of FIG. 7(B), frequencies are determined that may be employable between first and second cells (step 168), where the first and second cells refer to adjacent and overlapping cells. A first frequency may be chosen for a UE within the first cell edge (step 172). A second frequency may then be chosen for a UE within the second cell edge, where the second frequency is different from the first frequency (step 172). Frequencies other than the first (or second) frequencies may then be employed for the first (or second) cell interiors (step 176).

Figure 8:
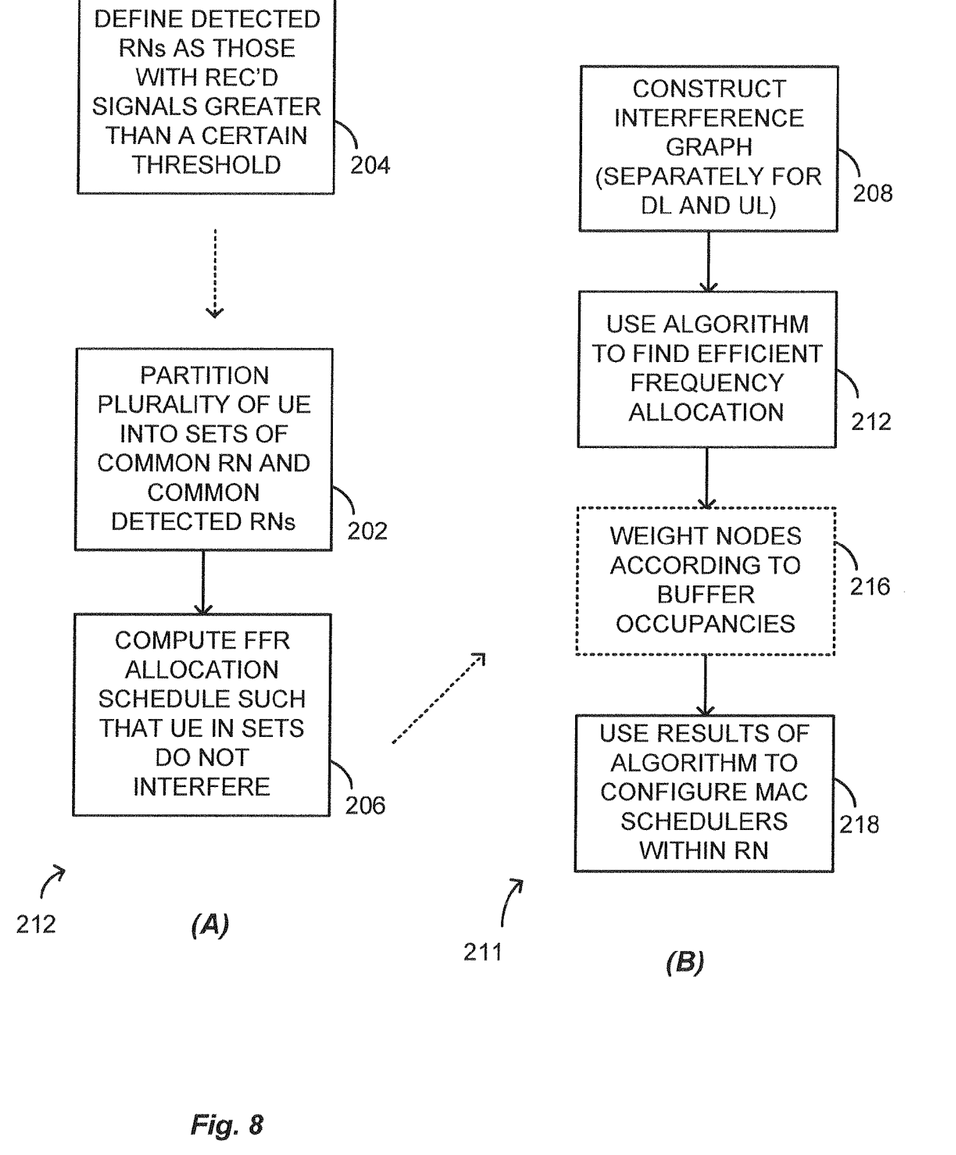
FIGS. 8(A) and 8(B) are flowcharts of another illustrative method according to present principles for reducing UE interference using FFR.

In further detail, and referring to the flowchart 212 of FIG. 8(A), in one implementation a central coordinator algorithm partitions all UEs into separate sets with each set comprising UEs having the same serving radio node (eNB) and the same detected set of radio nodes (step 202). The same detected set of radio nodes may be, e.g., relative to a given threshold of signal strength, and so the detected radio nodes may be defined as those with received signals greater than a predetermined threshold (step 204). Step 202 generally results in a plurality of sets of UEs, each set constituted of UEs in the same general vicinity.

A next step in the flowchart 212 is to compute an FFR allocation schedule such that UEs within a given set do not interfere and/or do not cause interference with UEs in adjacent cells (step 206). One way of computing such an FFR allocation schedule is provided in the flowchart 211 of FIG. 8(B).

In flowchart 211, it is noted that the sets formed in step 202 may be characterized by the number of UEs in each set, the aggregate downlink buffer occupancy of all UEs in the set, and the aggregate UL buffer occupancy of all UEs in the set. An interference graph may then be constructed for each set (step 208). Exemplary interference graphs are illustrated in FIGS. 5(B) (downlink) and 5(C) (uplink). Referring to these figures, each node in the graphs ($160_1$-$160_6$) represents a link between a cell and a set of its served UEs. For example, the node $160_1$ represents a link between the first radio node (RN1) $115_1$ and a user equipment UE1 $125_1$ which is located in the cell edges of both cells $120_1$ and $120_2$ but is served by radio node $115_1$. The first radio node $115_1$ is in two nodes ($160_1$ and $160_2$) while the second radio node $115_2$ is in only one ($160_3$), because the first radio node serves two UEs while the second only serves one.

Between the nodes $160_1$-$160_6$ are a series of edges $165_1$-$165_5$. Each edge 165, indicates that the nodes at its ends interfere and cannot be simultaneously scheduled. For example, UE 1 and UE 0 cannot be simultaneously scheduled on the downlink as the same would cause interference at the two UEs. However, also on the downlink, UE 0, served by the first radio node, may be scheduled simultaneously with UE 2, served by the second radio node, by ensuring that lower power transmissions are used on those frequencies used in a cell interior that are also used at the cell edges by adjacent cells. In the uplink, the interference graph is different from that in the downlink with UE2's transmissions interfering with transmissions of UE0.

Referring back to FIG. 8(B), an algorithm may employ the interference graphs created in step 208 to converge to an efficient frequency allocation (step 212). One such algorithm may be a heuristic independent set algorithm. In such, a match may be a set of nodes in a graph such that no two nodes are connected by an edge. Whatever the algorithm, the outcome may generally be that all sets of UEs are served efficiently.

In an advanced implementation, the nodes may be weighted according to their associated buffer occupancies (step 216). For example, the weighting may be employed to allocate and partition frequencies such that UEs with greater data to transfer, i.e., greater buffer occupancies, may be allocated additional resources until such time as their data to transfer is decreased. Once the allocation has been determined, the individual MAC schedulers within each radio node may be configured appropriately to carry out the allocation (step 218).

Figure 9:
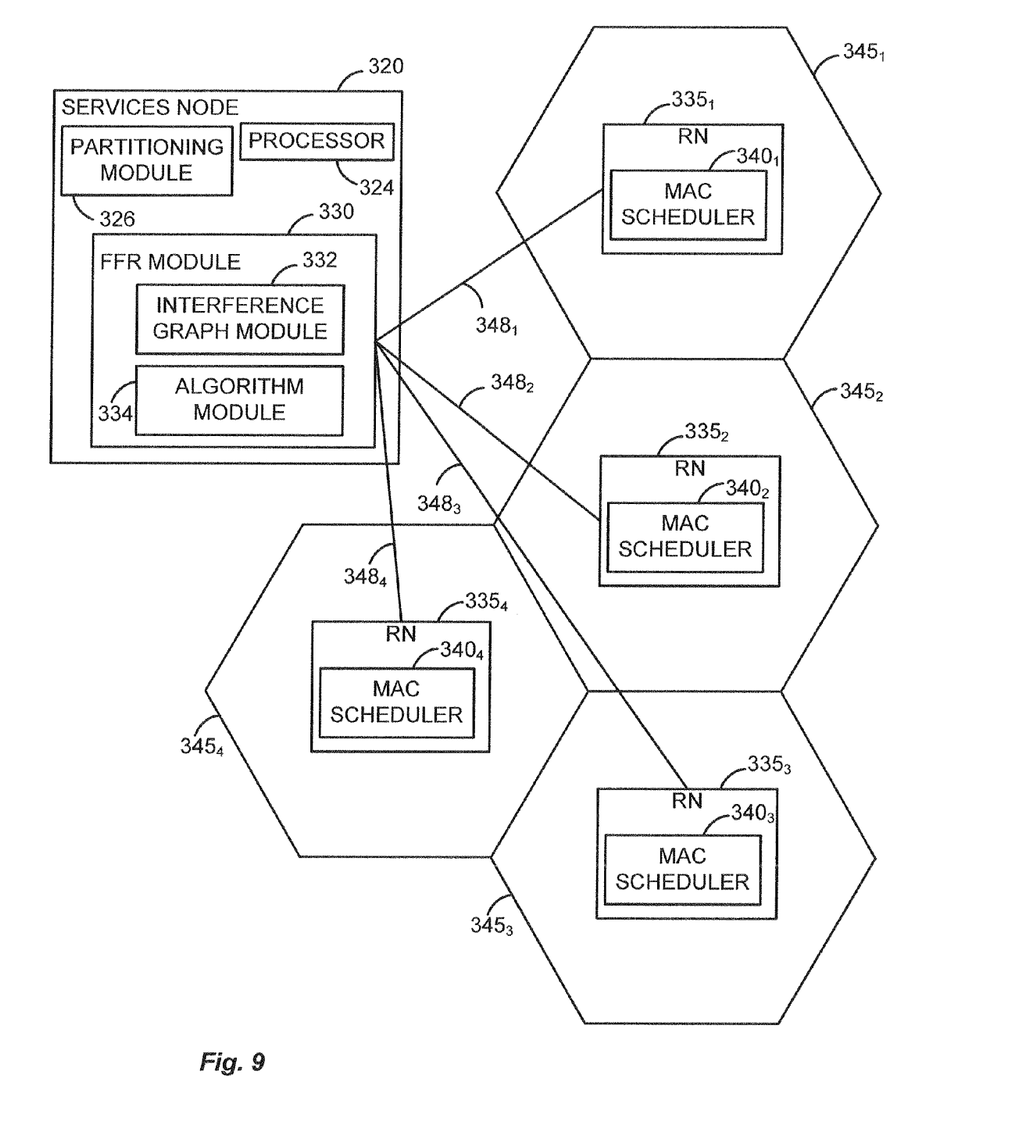
FIG. 9 illustratively shows a simplified functional block diagram of illustrative hardware infrastructure for a services node, as well as illustrative radio nodes, which may be utilized to implement the present principles.

Referring now to the schematic layout of FIG. 9, an exemplary services node 320 is illustrated in radio communication with a number of cells $345_1$-$345_4$. Each cell $345_i$ includes a radio node $335_i$ within. Each radio node 335, includes at least one MAC scheduler $340_i$. The MAC scheduler $340_i$ is responsible for scheduling transmissions in both the uplink and downlink directions for UEs it serves.

The services node 320 includes a processor 324 and a number of modules to carry out desired functionality, including a partitioning module 326 and an FFR module 330. The partitioning module 326 may perform the function stated above of separating UEs into sets according to common serving radio node as well as by common sets of detected radio nodes. The FFR module 330 may take information from the partitioning module 326 and perform a number of functions with the same, including creating interference graphs indicating which UEs may encounter interference if not separately scheduled. An interference graph module 332 within the FFR module 330 may construct interference graphs or may perform other functionality equivalent to creating the interference graphs. It will be understood that other algorithms may be employed to allocate frequencies so long as the same results in efficient frequency usage between UEs.

An algorithm module 334 within the FFR module 330 may then analyze the interference graphs to construct an efficient frequency allocation. For example, various independent set algorithms may be employed, such as the one noted above in which a lack of an edge indicates a potential set of UEs which may be simultaneously scheduled. The independent set algorithms may include heuristic algorithms.

Once the FFR module 330 has received data from the UEs and converged to an efficient FFR solution, the solution is communicated to the radio nodes $335_i$ via communication paths $348_1$-$348_4$. The communication paths $348_1$-$348_4$ may be implemented in a number of ways, including in fiber, cabling, wireless, or other ways as are known or may be developed.

Several aspects of telecommunication systems will now be presented with reference to various apparatus and methods described in the foregoing detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionalities described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable media. Computer-readable media may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable media for storing or transmitting software. The computer-readable media may be resident in the processing system, external to the processing system, or distributed across multiple entities including the processing system. Computer-readable media may be embodied in a computer-program product. By way of example, a computer-program product may include one or more computer-readable media in packaging materials. Those skilled in the art will recognize how best to implement the described functionality presented throughout this disclosure depending on the particular application and the overall design constraints imposed on the overall system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of allocating frequencies for a plurality of user equipment in a small cell network in which a number of radio nodes are controlled by a services node, the method comprising the steps of:
   a. for a plurality of user equipment relative to a set of radio nodes, each radio node associated with a cell and having a cell interior and a cell edge, allocating transmission frequencies such that interfering links or transmissions in adjacent cells are not simultaneously scheduled;
   b. wherein the allocating is performed by a central services node controlling MAC scheduling of the radio nodes, and not by the radio nodes themselves, and wherein, for a given cell, frequencies allocated to user equipment in the cell interior are different from those allocated to user equipment in the cell edge, and wherein the allocating includes:
      i. partitioning the plurality of user equipment into sets, each set associated with a serving radio node and a common set of detected radio nodes; and
      ii. computing a fractional frequency reuse allocation schedule based on the partitioned sets, such that user equipment in different sets that interfere with each other are not simultaneously scheduled; and
   wherein each set is characterized by the number of user equipment within the set, an aggregate downlink buffer occupancy of all user equipment in the set, and an aggregate uplink buffer occupancy of all user equipment in the set.

2. The method of claim 1, wherein the allocating includes the following steps:
   a. determining a first number of frequencies employable for user equipment within a first cell having a first cell edge and a first interior;
   b. determining a second number of frequencies employable for user equipment within an adjacent cell having a second cell edge and a second interior;
   c. choosing at least a first frequency from the first number for use by user equipment within the first cell edge; and
   d. choosing at least a second frequency from the second number for use by user equipment within the second cell edge, wherein the first frequency is different from the second frequency.

3. The method of claim 2, further comprising choosing frequencies from the first number, except the first frequency, for use by user equipment within the first cell interior and choosing frequencies from the second number, except the second frequency, for use by user equipment within the second cell interior.

4. The method of claim 1, wherein a radio node is a detected radio node if a signal received from the radio node has an amplitude greater than a predetermined threshold.

5. The method of claim 1, further comprising constructing an interference graph for the plurality of user equipment, wherein each node in the graph represents a link between a radio node and individual user equipment in the set served by the radio node, and each edge in the graph represents interference between user equipment in the nodes terminating the edge.

6. The method of claim 5, wherein the computing a fractional frequency reuse allocation schedule includes employing a heuristic independent set algorithm where a set of independent nodes is one not connected by an edge.

7. The method of claim 5, wherein the computing a fractional frequency reuse allocation schedule includes employing a heuristic independent set algorithm where an independent set is a set of nodes in a graph such that no two nodes are connected by an edge.

8. The method of claim 5, wherein the computing a fractional frequency reuse allocation schedule is performed separately for uplinks and for downlinks.

9. The method of claim 1, wherein the computing a fractional frequency reuse allocation schedule further comprises a calculation that includes the aggregate downlink buffer occupancy, the aggregate uplink buffer occupancy, or both.

10. The method of claim 1, further comprising using the computed fractional frequency reuse allocation schedule to configure a MAC scheduler within each radio node through the services node.

11. A method of allocating frequencies for a plurality of user equipment in a small cell network in which a number of radio nodes are controlled by a services node, the method comprising the steps of:
   for a plurality of user equipment relative to a set of radio nodes, each radio node associated with a cell and having a cell interior and a cell edge, allocating transmission frequencies such that interfering links or transmissions in adjacent cells are not simultaneously scheduled, wherein the allocating is performed by a central services node controlling MAC scheduling of the radio nodes, and wherein, for a given cell, frequencies allocated to user equipment in the cell interior are different from those allocated to user equipment in the cell edge, wherein the allocating includes the following steps:
      a. partitioning the plurality of user equipment into sets, each set associated with a serving radio node and a common set of detected radio nodes;
      b. computing a fractional frequency reuse allocation schedule such that user equipment in different sets that interfere with each other are not simultaneously scheduled,
   further comprising constructing an interference graph for the plurality of user equipment, wherein each node in the graph represents a link between a radio node and individual user equipment in the set served by the radio node, and each edge in the graph represents interference between user equipment in the nodes terminating the edge, and wherein each set is characterized by aggregate downlink and uplink buffer occupancies of all user equipment in the set, and further comprising weighting each node according to the downlink or uplink buffer occupancies or both, and employing the weighting in the computing.

12. A non-transitory computer readable medium, comprising instructions for causing a computing environment to perform the method of claim 1.

13. A services node, controlling a plurality of radio nodes in a radio access network environment, the plurality of radio nodes communicating voice and data to a plurality of user equipment in the radio access network environment, comprising:
   a. a partitioning module to partition a plurality of user equipment into sets, each set associated with a serving radio node and a common set of detected radio nodes, each set characterized by the number of user equipment within the set, an aggregate downlink buffer occupancy of all user equipment in the set, and an aggregate uplink buffer occupancy of all user equipment in the set; and
   b. a fractional frequency reuse allocation module to compute and allocate transmission frequencies such that user equipment in different sets that interfere with each other are not simultaneously scheduled, wherein the allocation module within the services node, and not the radio node, is configured to allocate transmission frequencies, such that, for a given cell, the fractional frequency reuse allocation module allocates frequencies to user equipment in a cell interior that are different from those allocated to user equipment in a cell edge, wherein the fractional frequency reuse allocation module computes a fractional frequency reuse allocation schedule based on the sets partitioned by the partitioning module, and wherein the fractional frequency reuse allocation module allocates frequencies separately for uplinks and downlinks.

14. The services node of claim 13, wherein the fractional frequency reuse allocation module further comprises:
   a. an interference graph module to construct an interference graph for the plurality of user equipment, wherein each node in the graph represents a link between a radio node and individual user equipment in the set served by the radio node, and each edge in the graph represents interference between user equipment in the nodes terminating the edge; and
   b. a heuristic independent set algorithm module configured to denote a match where a set of nodes is not connected by an edge.

15. The services node of claim 14, wherein the heuristic independent set algorithm module is configured to denote matches constituting a set of nodes in a graph such that no two nodes are connected by an edge.

16. The services node of claim 13, wherein the fractional frequency reuse allocation module is configured to transmit the computed frequency allocation to MAC schedulers within each radio node.

* * * * *